US011334088B2

(12) United States Patent
Hitosugi et al.

(10) Patent No.: US 11,334,088 B2
(45) Date of Patent: May 17, 2022

(54) VEHICLE POSITION DETECTOR, AUTOMATIC STEERING CONTROLLER, VEHICLE POSITION DETECTING METHOD, AND AUTOMATIC STEERING CONTROL METHOD

(71) Applicant: Mitsubishi Electric Corporation, Tokyo (JP)

(72) Inventors: Kazuo Hitosugi, Tokyo (JP); Toshihide Satake, Tokyo (JP); Takahiro Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 272 days.

(21) Appl. No.: 16/111,865

(22) Filed: Aug. 24, 2018

(65) Prior Publication Data
US 2018/0364736 A1 Dec. 20, 2018

Related U.S. Application Data

(62) Division of application No. 15/617,037, filed on Jun. 8, 2017, now Pat. No. 10,139,835.

(30) Foreign Application Priority Data

Aug. 4, 2016 (JP) ................................ 2016-153374

(51) Int. Cl.
G05D 1/02 (2020.01)
B62D 6/00 (2006.01)
(Continued)

(52) U.S. Cl.
CPC ........... G05D 1/0278 (2013.01); B62D 6/001 (2013.01); G01C 21/165 (2013.01); G01S 19/49 (2013.01);
(Continued)

(58) Field of Classification Search
CPC ...... G05D 1/0278; G05D 1/0274; G05D 1/02; G05D 2201/0213; B62D 6/001; B62D 6/00; G01S 19/49; G01C 21/165; G01C 21/16
See application file for complete search history.

(56) References Cited

U.S. PATENT DOCUMENTS 9,020,757 B2 * 4/2015 Peake ................... B62D 15/025
701/500
9,121,929 B2 * 9/2015 Okamura ................ G01S 19/00
(Continued)

FOREIGN PATENT DOCUMENTS

JP 10-311734 A 11/1998
JP 2003-279362 A 10/2003
(Continued)

OTHER PUBLICATIONS

Communication dated Jun. 6, 2017, issued by the Japanese Patent Office in counterpart Japanese Application No. 2016-153374.

Primary Examiner — Hussein Elchanti
(74) Attorney, Agent, or Firm — Sughrue Mion, PLLC; Richard C. Turner

(57) ABSTRACT

A vehicle position detector includes: a satellite positioning receiver; an autonomous navigation processor outputting an own-vehicle position as an autonomous navigation position; a determining unit determining occurrence of a position jump on the basis of a positional difference between the autonomous navigation position and a satellite positioning position detected by the satellite positioning receiver using satellite positioning; and a selector selecting one of the autonomous navigation position and the satellite positioning position on the basis of positioning precision of satellite positioning output by the satellite positioning receiver, and a result of the determination, wherein the vehicle position detector outputs one of the autonomous navigation position (Continued)

and the satellite positioning position as the own-vehicle position on the basis of a result of the selection.

9 Claims, 9 Drawing Sheets

(51) Int. Cl.
*G01C 21/16* (2006.01)
*G01S 19/49* (2010.01)

(52) U.S. Cl.
CPC ... *G05D 1/0274* (2013.01); *G05D 2201/0213* (2013.01)

(56) References Cited

U.S. PATENT DOCUMENTS

| | | | | |
|---|---|---|---|---|
| 2008/0059068 A1* | 3/2008 | Strelow | ............... | G05D 1/0246 |
| | | | | 701/469 |
| 2008/0249692 A1 | 10/2008 | Dix | | |
| 2014/0149032 A1* | 5/2014 | Barrett | ............... | G01C 21/32 |
| | | | | 701/409 |
| 2015/0073697 A1* | 3/2015 | Barrett | ............... | G01S 19/39 |
| | | | | 701/409 |
| 2016/0018821 A1* | 1/2016 | Akita | ............... | G05D 1/0022 |
| | | | | 701/2 |
| 2016/0167702 A1* | 6/2016 | Morimoto | ............ | B62D 15/025 |
| | | | | 701/41 |
| 2017/0113696 A1 | 4/2017 | Oh et al. | | |
| 2017/0122754 A1 | 5/2017 | Konishi et al. | | |
| 2017/0235313 A1 | 8/2017 | Sakamoto et al. | | |
| 2017/0349209 A1 | 12/2017 | Kloess et al. | | |
| 2018/0009437 A1 | 1/2018 | Ooba | | |

FOREIGN PATENT DOCUMENTS

| | | |
|---|---|---|
| JP | 2006-177772 A | 7/2006 |
| JP | 2013-122406 A | 6/2013 |
| JP | 2014-224715 A | 12/2014 |

\* cited by examiner

F I G. 1
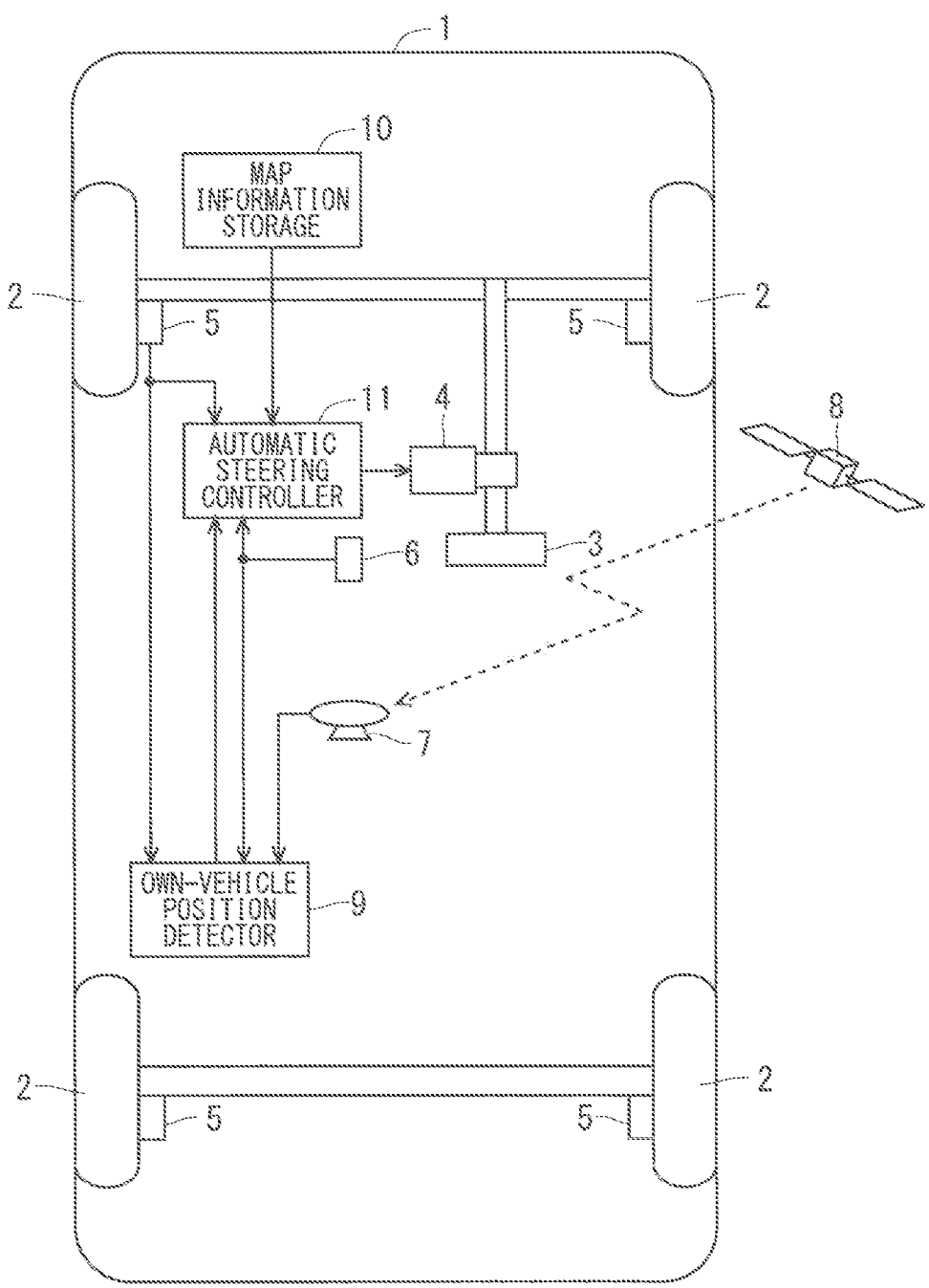

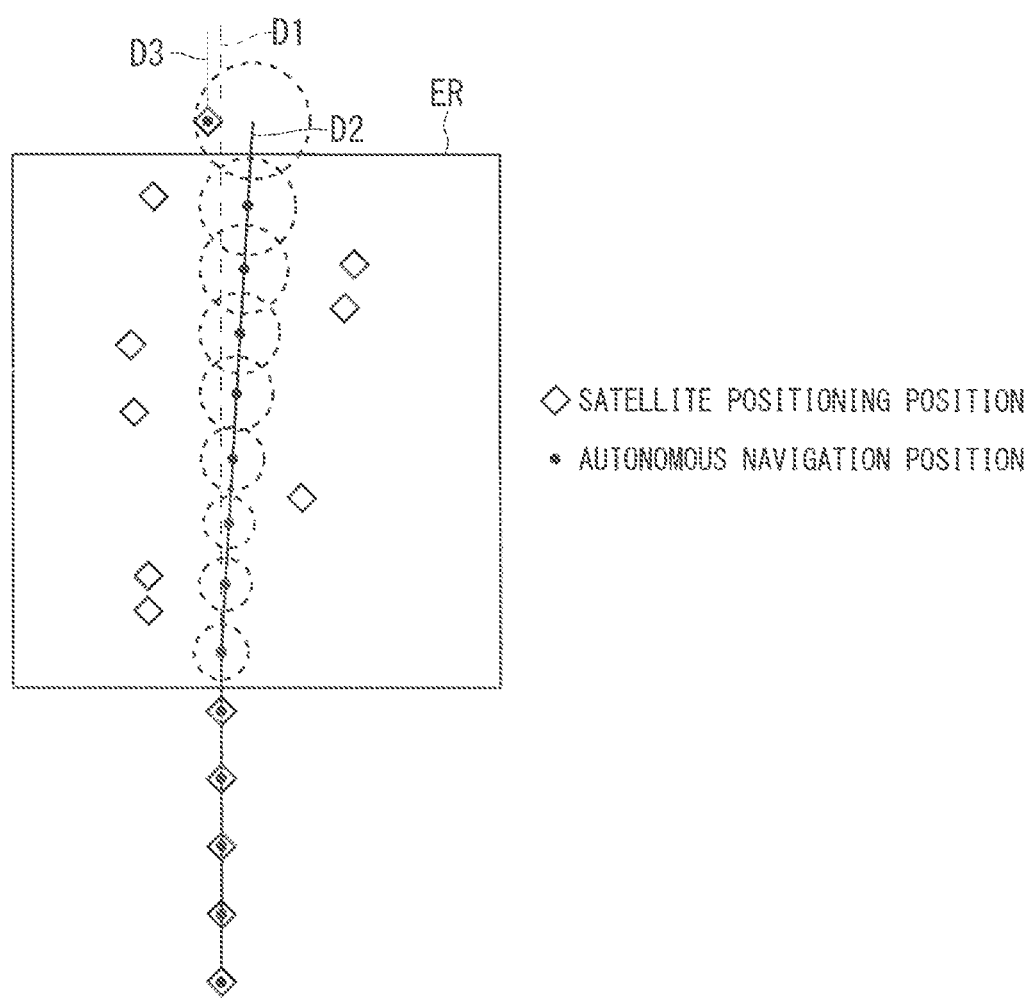

VEHICLE POSITION DETECTOR, AUTOMATIC STEERING CONTROLLER, VEHICLE POSITION DETECTING METHOD, AND AUTOMATIC STEERING CONTROL METHOD

CROSS REFERENCE TO RELATED APPLICATIONS

This application is a Divisional Application of U.S. patent application Ser. No. 15/617,037 filed Jun. 8, 2017, which claims priority from Japanese Patent Application No. 2016-153374 filed Aug. 4, 2016, the contents of which are incorporated herein by reference in their entireties.

BACKGROUND OF THE INVENTION

Field of the Invention

The present invention relates to a vehicle position detector that can detect an own-vehicle position with high precision, and an automatic steering controller that controls automatic driving of a vehicle on the basis of the own-vehicle position.

Description of the Background Art

Recent years have seen the development of self-driving vehicles that compute a target driving route using own-vehicle position information and map information that are highly precise and obtained from satellites and then can be automatically driven along the target driving route.

Although the automatic driving is predicated upon obtainment of highly precise own-vehicle position information, the position data obtained from satellites is subject to the environment surrounding the vehicle and thus a position jump by which the data largely alters may occur.

In order to address such a position jump, for example, Japanese Patent Application Laid-Open No. 2013-122406 discloses a technique for detecting a position jump of an object by calculating an estimated position of the object and calculating a difference between the estimated position and a measured position obtained from a satellite.

When the position jump is detected, the own-vehicle position is corrected. In Japanese Patent Application Laid-Open No. 2013-122406, the processes require time longer than the update cycle of satellite information, thus causing a problem in that precise own-vehicle position information cannot be obtained over a long period of time.

Furthermore, the correction of the own-vehicle position may consequently influence the automatic steering (steering operation) of the self-driving vehicles that perform automatic driving on the basis of own-vehicle position information, and destabilize the vehicle behavior such as occurrence of sudden route change.

SUMMARY OF THE INVENTION

Provided is a vehicle position detector that can immediately obtain precise own-vehicle position information. The vehicle position detector includes a satellite positioning receiver, an autonomous navigation processor, a determining unit, and a selector. The autonomous navigation processor outputs an own-vehicle position detected by the autonomous navigation as an autonomous navigation position. The determining unit determines occurrence of a position jump on the basis of a positional difference between the autonomous navigation position and a satellite positioning position detected by the satellite positioning receiver using the satellite positioning. The selector selects one of the autonomous navigation position and the satellite positioning position on the basis of positioning precision of the satellite positioning that is output by the satellite positioning receiver, and a result of the determination on position jump by the determining unit. The vehicle position detector outputs one of the autonomous navigation position and the satellite positioning position as the own-vehicle position on the basis of a result of the selection by the selector.

According to the present invention, it is possible to immediately obtain the precise own-vehicle position information.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram illustrating an overall structure of a self-driving vehicle to which the present invention is to be applied;

FIG. 13 schematically illustrates a misalignment according to the present invention when a position jump occurs.

DESCRIPTION OF THE PREFERRED EMBODIMENTS

Embodiment

Figure 2:
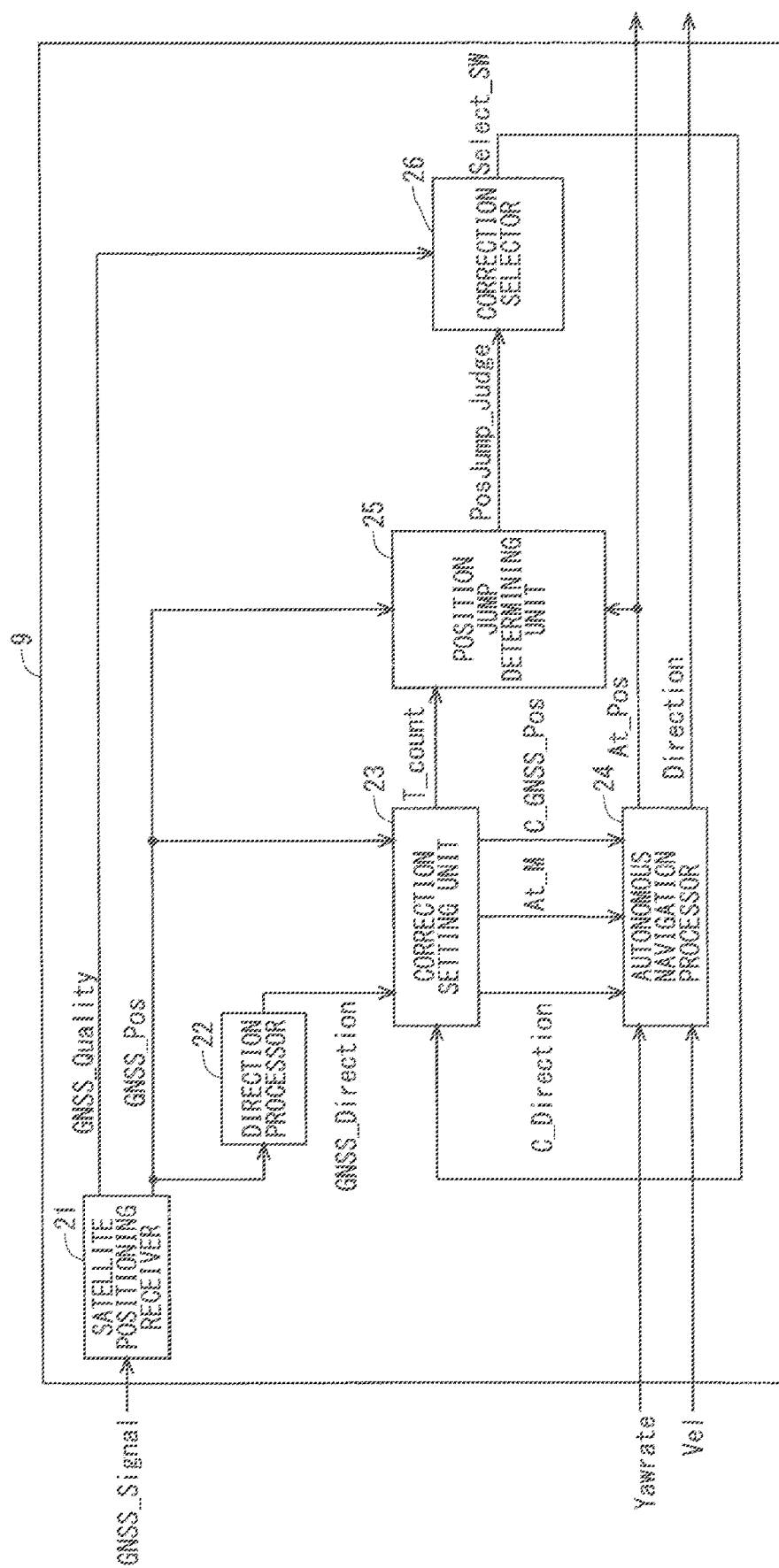
FIG. 2 is a block diagram illustrating a configuration of an own-vehicle position detector.

FIG. 1 is a block diagram illustrating an overall structure of a self-driving vehicle 1 capable of automatic driving as an example of a vehicle to which the present invention is applicable.

As illustrated in FIG. 1, the self-driving vehicle 1 includes a steering wheel 3 that operates two of tires 2 as front wheels and that is equipped with an electric power steering (EPS) motor/controller 4 in an EPS system, and has a structure in which the EPS motor/controller 4 allows automatic steering of the steering wheel 3 on the basis of a control signal obtained from an automatic steering controller 11.

The automatic steering controller 11 is also referred to as an advanced driving assistance systems-electronic control unit (ADAS-ECU). The automatic steering controller 11 computes a target driving route on the basis of the highly precise map information stored in a map information storage 10 and the own-vehicle position information that is highly precise and detected by an own-vehicle position detector 9, and provides automatic steering and controls the velocity and the brake for the steering wheel 3 according to the target driving route.

Each of the two tires 2 includes a velocity sensor 5 that measures the number of rotations of the tire 2 to calculate the velocity and provides the velocity to the automatic steering controller 11. The method for obtaining the velocity is not limited to such.

Furthermore, a yaw rate sensor 6 measures a yaw rate (a rate of change of angular velocity in a rotation direction) of the vehicle and provides it to the automatic steering controller 11.

The own-vehicle position detector 9 detects (computes) a position of the own vehicle on the basis of an satellite signal received from an artificial satellite 8 such as a global navigation satellite system (GNSS) or a quasi-zenith satellite through an antenna 7, and provides the own-vehicle position information to the automatic steering controller 11. Furthermore, the velocity sensors 5, the yaw rate sensor 6, for example, an acceleration sensor, a gyro sensor, and an azimuth sensor that are not illustrated are connected to the own-vehicle position detector 9 to allow autonomous navigation (inertial navigation) for autonomously detecting the position of the own vehicle on the basis of the information provided from each of the sensors.

Although the automatic steering controller 11 computes a target driving route on the basis of the highly precise own-vehicle position information detected by the own-vehicle position detector 9 in the above description, the own-vehicle position detector 9 may compute the target driving route on the basis of the highly precise map information and the own-vehicle position information and provide the target driving route information to the automatic steering controller 11.

Next, the configuration of the own-vehicle position detector 9 will be described with reference to the functional block diagram in FIG. 2. As illustrated in FIG. 2, the own-vehicle position detector 9 includes a satellite positioning receiver 21, a direction processor 22, a correction setting unit 23, an autonomous navigation processor 24, a position jump determining unit 25, and a correction selector 26.

The satellite positioning receiver 21 reads a satellite signal (GNSS_Signal) received through the antenna 7, and performs predetermined computation to output a precision indicator (GNSS_Quality) and a satellite positioning position (GNSS_Pos). Here, examples of the satellite positioning receiver 21 include a real-time kinematic (RTK) receiver that capable of RTK measurement.

In the RTK measurement, a moving object can be measured within a precision of a few centimeters. In other words, in the RTK measurement, a distance between a satellite and a receiver is obtained from the number of carriers and the phase difference to identify a position within a precision of a few centimeters.

When the RTK receiver estimates an integer portion of a wave number in a real number, the precision is defined as "Float" ranging from several tens of centimeters to 1 meter. When the RTK receiver fixes the integer portion of the wave number in an integer, the precision is defined as "Fix" ranging from 5 mm to 20 mm.

The satellite positioning receiver 21 outputs a satellite positioning position in both "Float" and "Fix". Furthermore, the satellite positioning receiver 21 outputs, as a precision indicator (GNSS_Quality), 1 indicating higher precision (first precision) in "Fix", and 0 indicating lower precision (second precision) in "Float".

In the RTK measurement, the satellite positioning receiver 21 in a reference station simultaneously performs positioning of the reference station whose position is fixed and a mobile station whose position is unknown. The reference station wirelessly transmits the observed data to the mobile station, and the satellite positioning receiver 21 obtains the position of the mobile station on the basis of the position of the reference station. Although the satellite positioning receiver 21 has a structure of receiving the positioning augmentation information based on the result of positioning by a fixed station to be a reference station, through a wireless communication system such as information transmitted from a mobile phone or an artificial satellite, an illustration of such a structure is omitted.

The direction processor 22 receives the satellite positioning position (GNSS_Pos), and computes a satellite positioning direction (GNSS_Direction), that is, a moving direction of the own vehicle. This computation is to obtain the moving direction (east, west, north and south) of the own vehicle by comparing the position of the own vehicle obtained with update timing of a previous satellite signal, with a position (current position) of the own vehicle obtained with update timing of a current satellite signal. The correction setting unit 23 receives the obtained satellite positioning direction (GNSS_Direction).

The correction setting unit 23 receives, besides the satellite positioning direction (GNSS_Direction), the satellite positioning position (GNSS_Pos) output from the satellite positioning receiver 21 and a selection result (Select_SW) output from the correction selector 26. When the position of the own vehicle is not corrected, the correction setting unit 23 outputs to the autonomous navigation processor 24 an autonomous maintaining signal (At_M) instructing that an autonomous navigation position (At_Pos) and an own-vehicle direction (Direction) should be maintained. Furthermore, the correction setting unit 23 sets a duration of detection of a position jump (T_Count), and outputs it to the position jump determining unit 25. When the position of the own vehicle is corrected, the correction setting unit 23 outputs to the autonomous navigation processor 24 a corrected position (C_GNSS_Pos) and a corrected direction (C_Direction).

The autonomous navigation processor 24 receives the yaw rate (Yawrate) measured by the yaw rate sensor 6 and the velocity (Vel) measured by the velocity sensor 5, and computes the autonomous navigation position (At_Pos) and the own-vehicle direction (Direction) on the basis of these inputs. Upon receipt of the corrected position (C_GNSS_Pos) and the corrected direction (C_Direction) from the correction setting unit 23, the autonomous navigation processor 24 outputs the autonomous navigation position (At_Pos) and the own-vehicle direction (Direction) that are computed, instead of the corrected position (C_GNSS_Pos) and the corrected direction (C_Direction). Upon receipt of the autonomous maintaining signal (At_M) from the correction setting unit 23, the autonomous navigation processor 24 outputs the autonomous navigation position (At_Pos) and the own-vehicle direction (Direction) that are computed.

The position jump determining unit 25 receives, besides the duration of detection of the position jump (T_Count) output from the correction setting unit 23, the satellite positioning position (GNSS_Pos) output from the satellite positioning receiver 21 and the autonomous navigation position (At_Pos) output from the autonomous navigation processor 24. The position jump determining unit 25 determines occurrence of a position jump on the basis of these inputs, and outputs to the correction selector 26 a result of the determination on position jump (PosJump_Judge).

The correction selector 26 receives, besides the result of the determination on position jump (PosJump_Judge), the precision indicator (GNSS_Quality) output from the satellite positioning receiver 21. The correction selector 26 outputs a selection result (Select_SW) indicating whether the position is to be corrected on the basis of these inputs.

Figure 3:
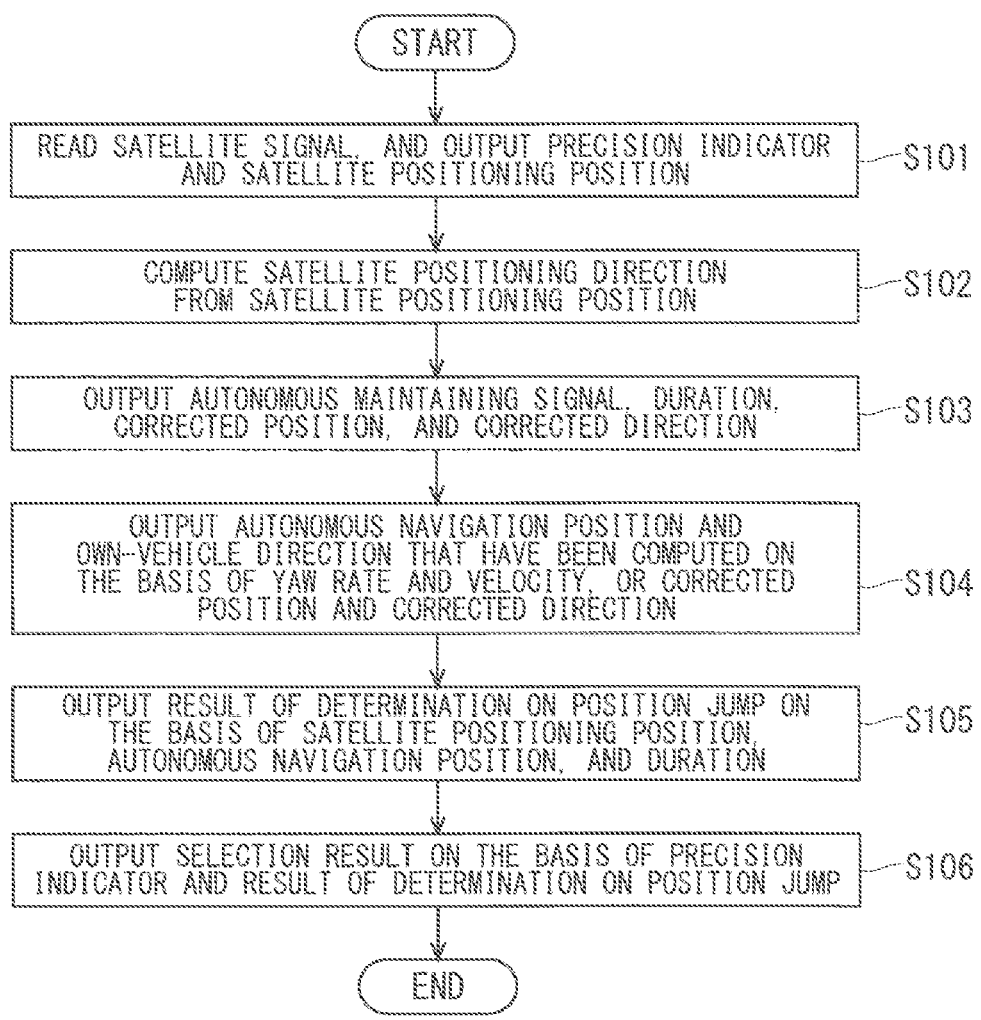
FIG. 3 is a flowchart for describing the overall operations of the own-vehicle position detector.

Next, the overall operations of the vehicle position detector 9 will be described with reference to the flowchart in FIG. 3.

The satellite positioning receiver 21 reads a satellite signal with predetermined update timing, and performs predetermined computation to output the precision indicator (GNSS_Quality) and the satellite positioning position (GNSS_Pos) (Step S101).

The direction processor 22 computes a moving direction of the own vehicle on the basis of the satellite positioning position (GNSS_Pos) received from the satellite positioning receiver 21 (Step S102).

When the position of the own vehicle is not corrected on the basis of the selection result (Select_SW), the correction setting unit 23 outputs to the autonomous navigation processor 24 the autonomous maintaining signal (At_M), and sets the duration of detection of the position jump (T_Count) to output it to the position jump detecting unit 25. When the position of the own vehicle is corrected on the basis of the selection result (Select_SW), the correction setting unit 23 outputs to the autonomous navigation processor 24 the corrected position (C_GNSS_Pos) and the corrected direction (C_Direction) (Step S103).

Upon receipt of the autonomous maintaining signal (At_M) from the correction setting unit 23, the autonomous navigation processor 24 computes the autonomous navigation position (At_Pos) and the own-vehicle direction (Direction) on the basis of the yaw rate (Yawrate) measured by the yaw rate sensor 6 and the velocity (Vel) measured by the velocity sensor 5 to output the results. Upon receipt of the corrected position (C_GNSS_Pos) and the corrected direction (C_Direction) from the correction setting unit 23 instead of the autonomous maintaining signal (At_M), the autonomous navigation processor 24 outputs the corrected position (C_GNSS_Pos) and the corrected direction (C_Direction) instead of the autonomous navigation position (At_Pos) and the own-vehicle direction (Direction) that have been computed (Step S104).

The position jump determining unit 25 determines occurrence of a position jump on the basis of the duration of detection of the position jump (T_Count) output from the correction setting unit 23, the satellite positioning position (GNSS_Pos) output from the satellite positioning receiver 21, and the autonomous navigation position (At_Pos) output from the autonomous navigation processor 24, and outputs, to the correction selector 26, 1 indicating that the position of the own vehicle is to be corrected, and 0 indicating that the position of the own vehicle is not corrected as a result of the determination on position jump (PosJump_Judge) (Step S105).

The correction selector 26 selects whether to correct the position on the basis of the result of the determination on position jump (PosJump_Judge) and the precision indicator (GNSS_Quality) output from the satellite positioning receiver 21, and outputs the selection result (Select_SW) to the correction setting unit 23 (Step S106).

Figure 4:
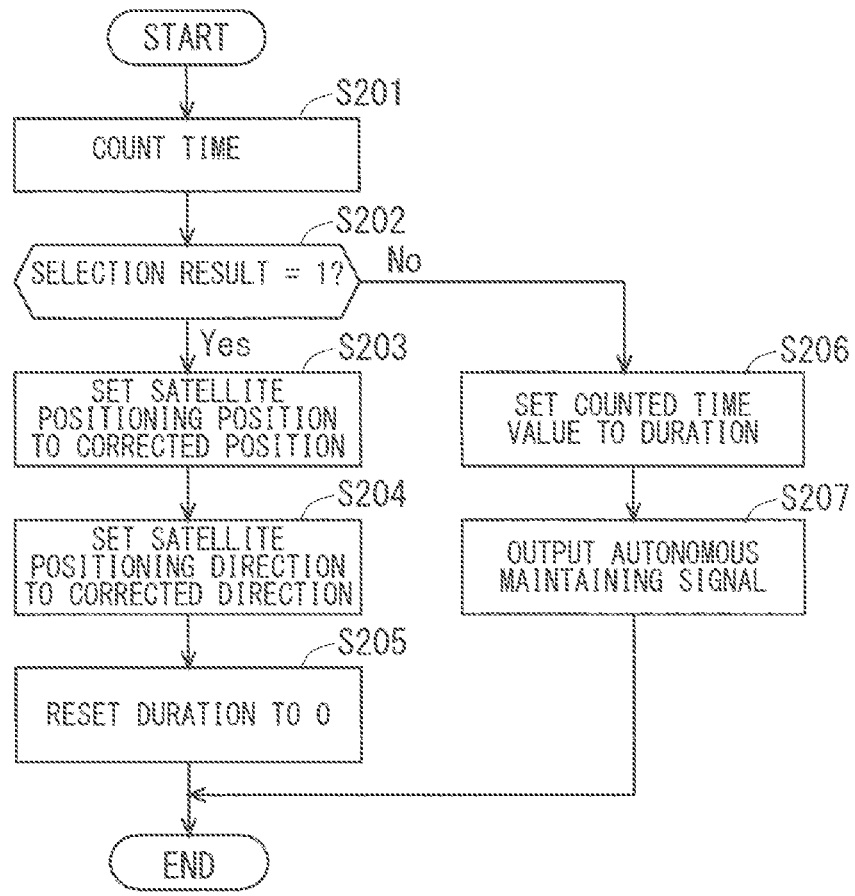
FIG. 4 is a flowchart for describing the overall operations of a correction setting unit.

Next, the configuration and the operations of each of the functional blocks of the own-vehicle position detector 9 will be described with reference to FIGS. 4 to 7. FIG. 4 is a flowchart for describing operations of the collection setting unit 23. The collection setting unit 23 is set to cyclically repeat the operations. Once the correction setting unit 23 starts the operations, a time counter inside starts counting the time (Step S201). The operating cycle of the correction setting unit 23 is shorter than the update cycle of a satellite signal, and is set to, for example, one half, one fifth, and one tenth.

When the selection result (Select_SW) output from the correction selector 26 is 0 and it is selected at Step S202 that the position of the own vehicle is not corrected, the correction setting unit 23 sets the counted time value to the duration of detection of the position jump (T_Count), and outputs it to the position jump determining unit 25 (Step S206). Then, the correction setting unit 23 outputs to the autonomous navigation processor 24 the autonomous maintaining signal (At_M) instructing that the autonomous navigation position (At_Pos) and the own-vehicle direction (Direction) should be maintained (Step S207), and ends a series of the operations.

When the selection result (Select_SW) is 1 and it is selected at Step S202 that the position of the own vehicle is to be corrected, the correction setting unit 23 sets the satellite positioning position (GNSS_Pos) to the corrected position (C_GNSS_Pos) (Step S203), and sets the satellite positioning direction (GNSS_Direction) to the corrected direction (C_Direction) (Step S204). Then, the collection setting unit 23 resets to 0 the duration of detection of the position jump (T_Count) (Step S205), and ends a series of the operations. In other words, the collection setting unit 23 ends the operations by determining that the position jump has been overcome using the satellite positioning position and the satellite positioning direction that have been corrected, instead of the autonomous navigation position (At_Pos) and the own-vehicle direction (Direction), respectively.

Figure 5:
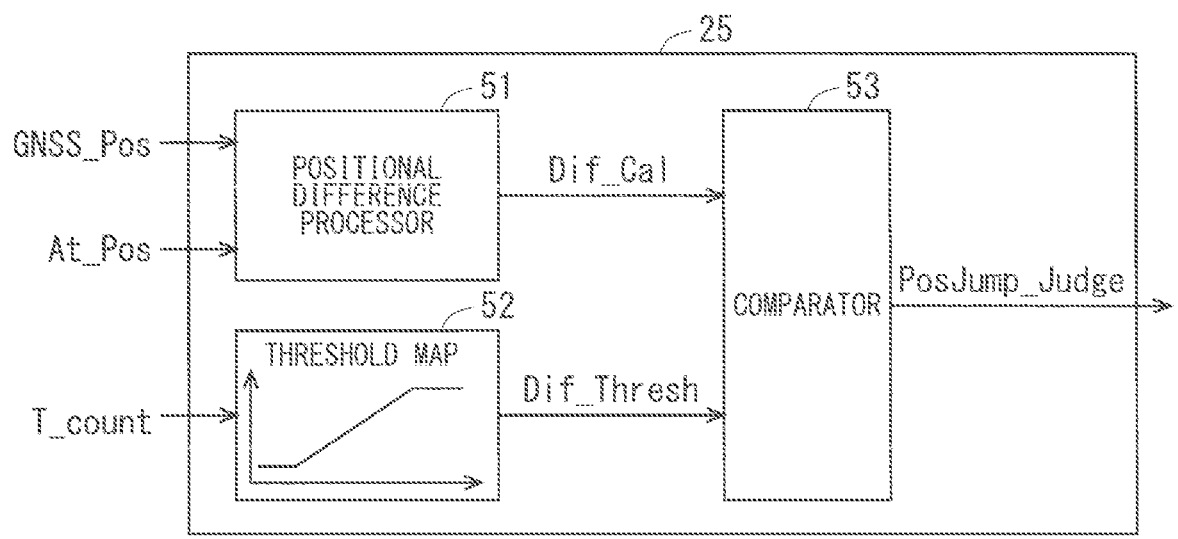
FIG. 5 is a block diagram illustrating a configuration of a position jump determining unit.

FIG. 5 is a functional block diagram illustrating the configuration of the position jump determining unit 25. As illustrated in FIG. 5, the position jump determining unit 25 includes a positional difference processor 51, a threshold determining unit 52 that determines a threshold for determining occurrence of the position jump using a threshold map, and a comparator 53.

The positional difference processor 51 receives the satellite positioning position (GNSS_Pos) and the autonomous navigation position (At_Pos). Each of the positions indicates a position on a two-dimensional plane. The positional difference processor 51 computes a distance between the two positions, and outputs it as a positional difference (Dif_Cal). The satellite positioning position and the autonomous navigation position may be provided as positions not on the two-dimensional plane but on a three-dimensional plane.

The threshold determining unit 52 receives the duration of detection of the position jump (T_Count) set by the correction setting unit 23, and determines the threshold for determining occurrence of the position jump using the threshold map stored in a memory such as a non-volatile memory. In other words, the duration of detection of the position jump (T_Count) is defined by the time counted by the correction setting unit 23, and the number of pulses is counted until the counter is reset. This means that the counting continues while an unacceptable level of a position jump continues, that is, a large position jump in an unacceptable level continues over a long time and the satellite positioning position (GNSS_Pos) and the satellite positioning direction (GNSS_Direction) cannot be used. If this continues, the vehicle is automatically driven only depending on the autonomous navigation position (At_Pos) and the own-vehicle direction (Direction), and thus the target driving route may deviate from its original. Here, when the duration of detection of the position jump becomes prolonged, conditions for determining the position jump are relaxed to forcibly correct the position of the own vehicle. Specifically, as the duration of detection of the position jump is longer, the threshold for determining occurrence of the position jump (Dif_Thresh) is set larger.

The comparator 53 compares the positional difference (Dif_Cal) computed by the positional difference processor 51 with the threshold for determining occurrence of the position jump (Dif_Thresh) determined by the threshold determining unit 52. When the threshold for determining occurrence of the position jump is larger than the positional difference, that is, when the positional difference falls within the threshold for determining occurrence of the position jump, the comparator 53 outputs 0 as the result of the determination on position jump (PosJump_Judge) indicating that the satellite positioning position is represented by an acceptable value (no occurrence of the position jump or occurrence of an allowable position jump). When the threshold for determining occurrence of the position jump is smaller than the positional difference, that is, when the positional difference does not fall within the threshold for determining occurrence of the position jump, the comparator 53 outputs 1 as the result of the determination on position jump (PosJump_Judge) indicating that the satellite positioning position is represented by an unacceptable value (occurrence of an unacceptable position jump).

The threshold map to be used by the threshold determining unit 52 may be a map in which a threshold for determining occurrence of a position jump linearly increases with respect to increase in duration of detection of the position jump, a stepped map in which the threshold is maintained constant during a relatively shorter duration and a relatively longer duration of detection of the position jump and the threshold linearly increases only between the end of the relatively shorter duration and the start of the relatively longer duration, or a map in which the threshold non-linearly increases. In consideration of sensing properties of the various sensors used in autonomous navigation, a map is created according to the precision of the autonomous navigation.

Figures 6, 7:
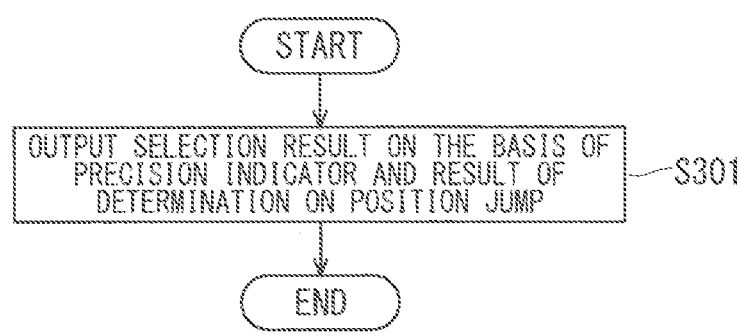
FIG. 6 is a flowchart for describing an operation of a correction selector.
FIG. 7 is a diagram indicating selection conditions for selecting whether to correct a position.

FIG. 6 is a flowchart for describing an operation of the correction selector 26. The correction selector 26 selects whether the position is to be corrected on the basis of the result of the determination on position jump (PosJump_Judge) output from the position jump determining unit 25 and the precision indicator (GNSS_Quality) output from the satellite positioning receiver 21, and outputs the selection result (Select_SW) (Step S301).

FIG. 7 is a diagram indicating with a matrix the selection conditions for selecting whether to correct the position. FIG. 7 indicates four possible combinations of (i) two values representing results of the determination on position jump, that is, 0 (no occurrence of a position jump or occurrence of an allowable position jump) and 1 (occurrence of an unacceptable position jump), and (ii) two values of the precision indicators, that is, 0 (lower precision) and 1 (higher precision).

The correction selector 26 selects to correct a position when the result of the determination on position jump is 0 and the precision indicator is 0, and outputs 1 as the selection result. Furthermore, the correction selector 26 selects to correct a position when the result of the determination on position jump is 0 and the precision indicator is 1, and outputs 1 as the selection result. Furthermore, the correction selector 26 selects not to correct a position when the result of the determination on position jump is 1 and the precision indicator is 0, and outputs 0 as the selection result. Furthermore, the correction selector 26 selects to correct a position when the result of the determination on position jump is 1 and the precision indicator is 1, and outputs 1 as the selection result. The selection by the correction selector 26 is summarized as follows:

(1) when the satellite positioning precision indicator indicates "higher precision", the current position of the own vehicle obtained by autonomous navigation is corrected to a position of the own vehicle obtained by the satellite positioning irrespective of the result of the determination on position jump output from the position jump determining unit 25;

(2) when the satellite positioning precision indicator indicates "lower precision" and the position jump determining unit 25 determines no occurrence of the position jump or occurrence of an allowable position jump as the result of the determination on position jump, the current position of the own vehicle obtained by autonomous navigation is corrected to a position of the own vehicle obtained by the satellite positioning; and (3) when the satellite positioning precision indicator indicates "lower precision" and the position jump determining unit 25 determines occurrence of an unacceptable position jump as the result of the determination on position jump, the current position of the own vehicle obtained by autonomous navigation is maintained.

Since computation of the moving direction of the own vehicle by the direction processor 22 and computation of the autonomous navigation position and the own-vehicle direction by the autonomous navigation processor 24 can be performed by a conventional computation method, the description thereof will be omitted.

Furthermore, the direction processor 22, the correction setting unit 23, the autonomous navigation processor 24, the position jump detecting unit 25, and the correction selector 26 in the own-vehicle position detector 9 may be implemented by hardware or by executing predetermined software in an arithmetic processing unit such as a central processing unit (CPU).

(Automatic Steering Control Based on Own-Vehicle Position Information)

As described with reference to FIG. 1, since the highly precise own-vehicle position information detected by the own-vehicle position detector 9 is provided to the automatic steering controller 11, the automatic steering controller 11 provides automatic steering and controls the velocity and the brake for the steering wheel 3 so that the self-driving vehicle 1 is capable of automatic driving.

Although imprecise own-vehicle position information destabilizes the behavior of the self-driving vehicle 1, the own-vehicle position detector 9 according to the present invention compares a positional difference between a satellite positioning position and an autonomous navigation position with a threshold for determining occurrence of the position jump, and corrects the autonomous navigation position to the satellite positioning position when the threshold is larger than the positional difference, that is, when the positional difference falls within the threshold. Accordingly, the behavior of the self-driving vehicle 1 will be stabilized without any sudden steering operation.

Figure 8:
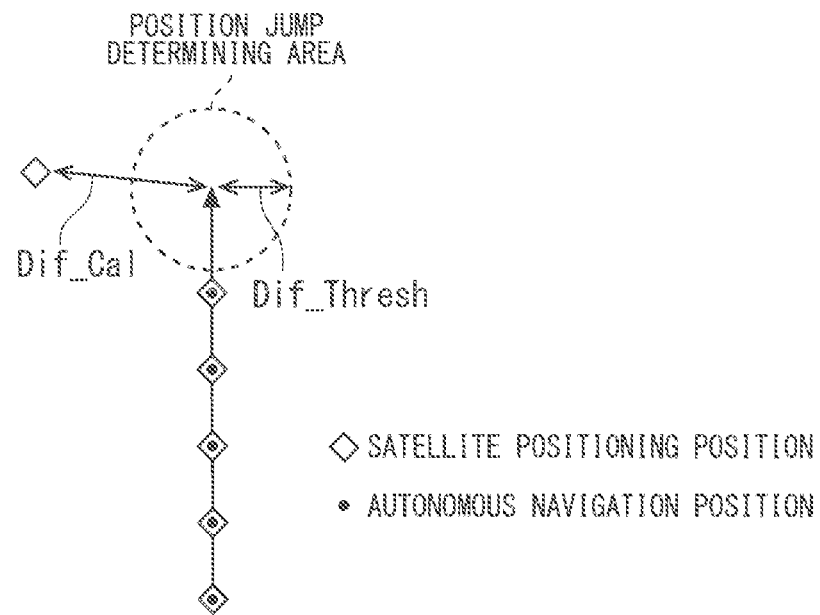
FIG. 8 schematically illustrates a relationship between a threshold for determining occurrence of a position jump and a positional difference.

This advantage will be described with reference to FIGS. 8 to 11. FIG. 8 schematically illustrates a relationship between a threshold for determining occurrence of the position jump (Dif_Thresh) and a positional difference (Dif_Cal) by plotting satellite positioning positions (GNSS_Pos) using rhombuses and autonomous navigation positions (At_Pos) using black circles. In FIG. 8, the satellite positioning positions almost match the autonomous navigation positions in a normal state. However, when the position jump occurs and the positional difference (Dif_Cal) between the satellite positioning position and the autonomous navigation position (indicated by a black triangle) is larger than the threshold for determining occurrence of the position jump (Dif_Thresh), the position jump determining unit 25 determines occurrence of the position jump. FIG. 8 illustrates a position jump determining area indicated by a dashed line that is an area with a radius of the threshold for determining occurrence of the position jump. When a satellite positioning position is within this area, the position jump determining unit 25 determines no occurrence of the position jump.

Figure 9:
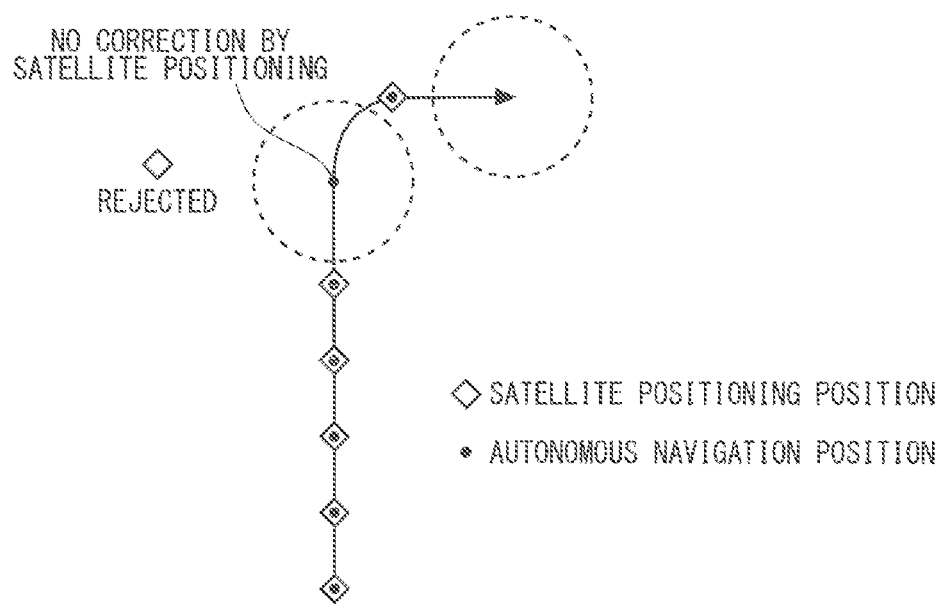
FIG. 9 schematically illustrates operations after determining that a position jump has occurred.

FIG. 9 illustrates the subsequent operations after determining that the position jump occurs in FIG. 8. When the satellite positioning precision indicator indicates "lower precision", the correction selector 26 maintains the current position of the own vehicle obtained by autonomous navigation. Thus, the satellite positioning position is rejected. Here, the own vehicle is driven along the target driving route, and the position jump is not detected with the next updating timing of the satellite signal. Then, the own vehicle proceeds further, and the occurrence of a position jump is determined with the updating timing after the next.

Figure 10:
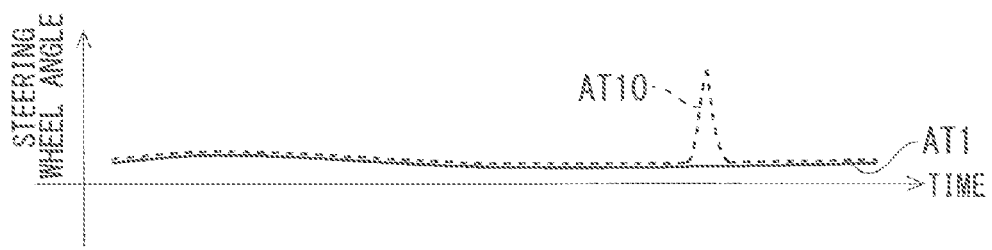
FIG. 10 is a diagram indicating a steering wheel angle using automatic steering when a position jump occurs.

FIG. 10 is a diagram indicating a conventional steering wheel angle using automatic steering when a position jump occurs, and a steering wheel angle to which the present invention has been applied, specifically, a diagram indicating temporal change characteristics AT10 (dashed line) of the conventional steering wheel angle, and temporal change characteristics AT1 (solid line) of the steering wheel angle to which the present invention has been applied. As illustrated in FIG. 10, conventionally, a sudden steering operation occurs when a position jump is detected and suddenly the steering wheel returns to its original position after sudden change in the steering wheel angle, thus destabilizing the vehicle behavior. In contrast, in the case where the present invention has been applied, even when a position jump occurs, a sudden steering operation does not occur because the current position of the own vehicle obtained by autonomous navigation is maintained, and the vehicle behavior is stable.

Figure 11:
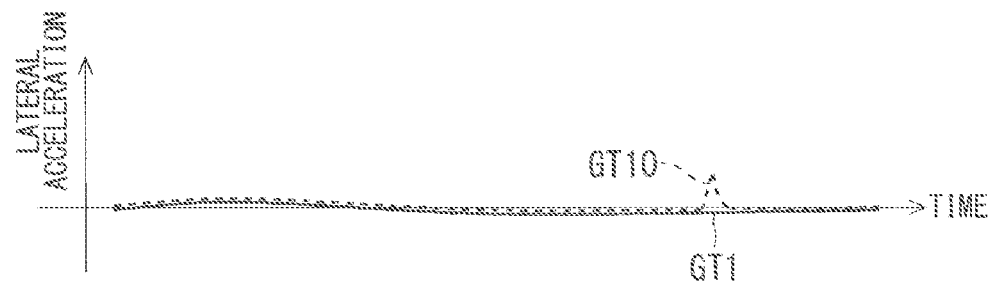
FIG. 11 is a diagram indicating a lateral acceleration using automatic steering when a position jump occurs.

FIG. 11 is a diagram indicating lateral accelerations when a position jump occurs and to which the present invention has been applied, specifically, a diagram indicating temporal change characteristics G10 (dashed line) of the conventional lateral acceleration, and temporal change characteristics GT1 (solid line) of the lateral acceleration to which the present invention has been applied. As illustrated in FIG. 11, detection of a position jump conventionally causes a lateral acceleration subject to a sudden steering operation to occur, whereas in the case where the present invention has been applied, even when a position jump occurs, neither a sudden steering operation nor lateral acceleration occurs.

(Countermeasures when Position Jump Continues)

Figure 12:
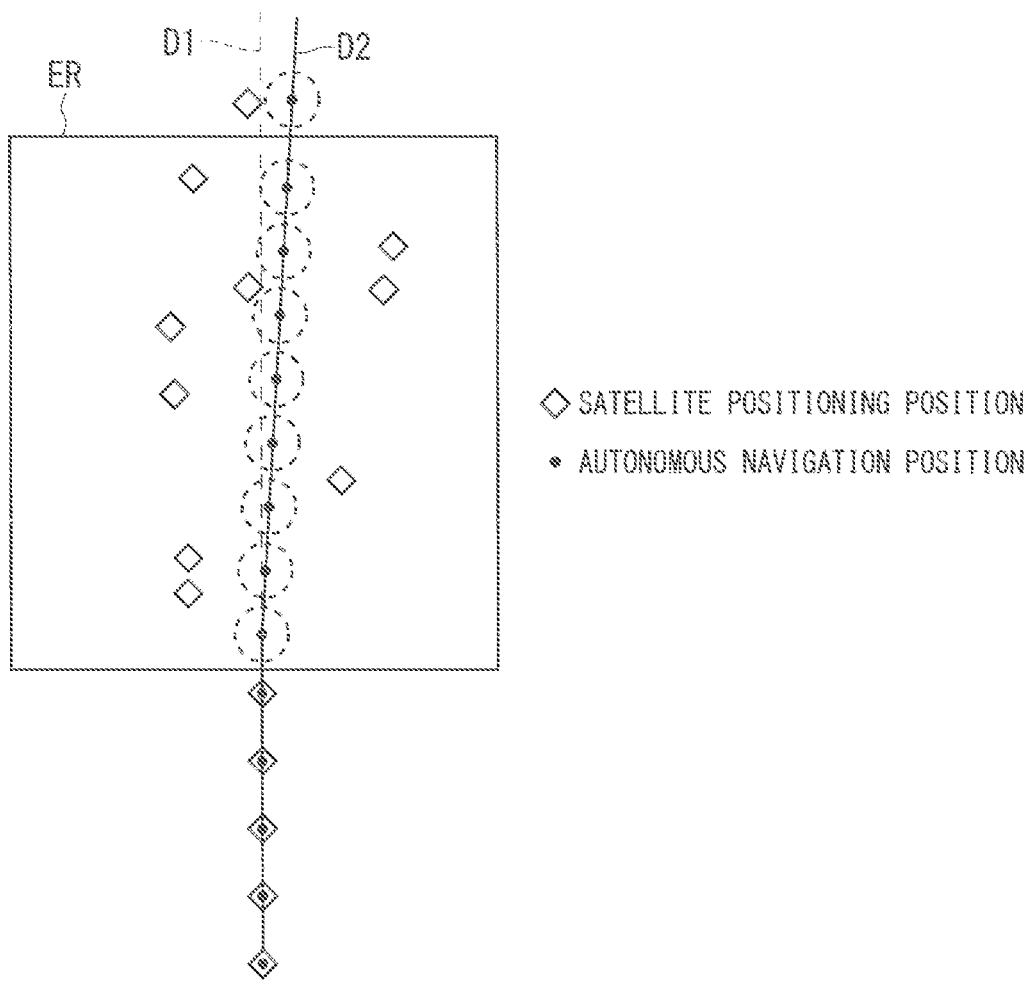
FIG. 12 schematically illustrates a misalignment in detecting a position jump by a conventional method when a position jump occurs.

Next, the countermeasures when a position jump continues will be described with reference to FIGS. 12 and 13. FIG. 12 schematically illustrates a misalignment in detecting a position jump by a conventional method when the position jump occurs.

In FIG. 12, the satellite positioning positions are plotted using rhombuses and the autonomous navigation positions are plotted using black circles, in the same manner as FIG. 8. Furthermore, the position jump determining areas are indicated by respective dashed lines. When the position jump continues and the satellite positioning positions cannot be used, the autonomous navigation positions are misaligned from the actual own-vehicle positions depending on the precision of autonomous navigation in the driving based on the autonomous navigation positions. In other words, a track D2 of the positions of the own vehicle obtained by autonomous navigation is misaligned from an actual track D1 of the own vehicle as illustrated in FIG. 12. Since the position jump determining areas are not dynamically changed in the conventional detection of a position jump, even when the own vehicle passes through an area ER where the position jump occurs and the satellite positioning positions approximate to an area closer to the actual own-vehicle positions, in the case where the position jump determining areas are narrow, the satellite positioning position is rejected and the misalignment in the positions of the own vehicle obtained by autonomous navigation will not be persistently corrected.

FIG. 13 schematically illustrates a misalignment in detecting a position jump according to the present invention when the position jump occurs. As illustrated in FIG. 13, the position jump determining areas are dynamically changed by increasing a threshold for determining occurrence of a position jump as a duration of detection of the position jump is longer in detecting the position jump according to the present invention. Thus, when the own vehicle passes through the area ER where the position jump occurs and the satellite positioning positions approximate to the area closer to the actual own-vehicle positions, since the position jump determining areas are wider, the autonomous navigation positions can be corrected to the satellite positioning positions, and the track D2 of the positions of the own vehicle obtained by autonomous navigation can be corrected to a track D3 closer to the actual own-vehicle positions.

(Examples of Other Precision Indicators)

Although "Fix" and "Float" in the RTK measurement are used as the precision indicators output by the satellite positioning receiver 21 according to the embodiment of the present invention, the precision indicators in the satellite positioning are not limited to these.

In other words, since the positioning precision varies according to a geometric positional relationship between an object to be measured (own vehicle) and a satellite and it also varies from moment to moment according to a position of the object and the time, dilution of precision (DOP) values have been proposed as indicators for understanding the positioning precision.

Examples of the DOP values include horizontal dilution of precision (HDOP) numerically representing the positional precision in a horizontal direction, and vertical dilution of precision (VDOP) numerically representing the positional precision in a vertical direction. For example, the favorable HDOP is 2.0 or lower. When the satellite positioning receiver 21 determines the HDOP to be 2.0 or lower, it may output 1 indicating higher precision as a precision indicator. When the HDOP exceeds 2.0, the satellite positioning receiver 21 may output 0 indicating lower precision as a precision indicator.

When the DOP is used as an precision indicator, the satellite positioning receiver 21 is not limited to a receiver for RTK measurement.

(Variations)

Although the structure according to the embodiment of the present invention adopts the own-vehicle position detector 9 and the automatic steering controller 11 as different devices as illustrated in FIG. 1, the own-vehicle position detector 9 and the automatic steering controller 11 may be incorporated into one device.

Furthermore, not all the constituent elements of the own-vehicle position detector 9 but at least the position jump determining unit 25 and the correction selector 26 may be incorporated into the automatic steering controller 11.

The embodiment according to the present invention can be appropriately modified and omitted within the scope of the invention.

The invention claimed is:

1. A vehicle position detector comprising:
a satellite positioning receiver;
an autonomous navigation processor that outputs an own-vehicle position detected by said autonomous navigation as an autonomous navigation position;
a processor that determines occurrence of a position jump on the basis of a positional difference between said autonomous navigation position and a satellite positioning position detected by said satellite positioning receiver using said satellite positioning; and
a selector that selects one of said autonomous navigation position and said satellite positioning position on the basis of positioning precision of said satellite positioning that is output by said satellite positioning receiver, and a result of said determination on position jump by said processor,
wherein said vehicle position detector outputs one of said autonomous navigation position and said satellite positioning position as said own-vehicle position on the basis of a result of said selection by said selector.

2. The vehicle position detector according to claim 1,
wherein said processor compares, with a threshold, said positional difference between said satellite positioning position and said autonomous navigation position, and determines when said positional difference falls within said threshold that said satellite positioning position is represented by an acceptable value and determines when said positional difference does not fall within said threshold that said satellite positioning position is represented by an unacceptable value.

3. The vehicle position detector according to claim 2,
wherein said selector selects said satellite positioning position as said own-vehicle position when said satellite positioning position is represented by said acceptable value.

4. The vehicle position detector according to claim 2,
wherein said positioning precision of said satellite positioning is defined by a first precision and a second precision lower than said first precision, and
said selector selects said satellite positioning position as said own-vehicle position irrespective of said result of said determination on position jump by said processor, when said positioning precision is defined by said first precision.

5. The vehicle position detector according to claim 2,
wherein said positioning precision of said satellite positioning is defined by a first precision and a second precision lower than said first precision, and
said selector selects said satellite positioning position as said own-vehicle position, when said positioning precision is defined by said second precision and said satellite positioning position is represented by said acceptable value.

6. The vehicle position detector according to claim 2,
wherein said positioning precision of said satellite positioning is defined by a first precision and a second precision lower than said first precision, and
said selector selects said autonomous navigation position as said own-vehicle position, when said positioning precision is defined by said second precision and said satellite positioning position is represented by said unacceptable value.

7. The vehicle position detector according to claim 2,
wherein when continuing to determine that said satellite positioning position is represented by said unacceptable value, said processor changes said threshold into a larger value on the basis of a duration during which said processor continues to determine that said satellite positioning position is represented by said unacceptable value.

8. The vehicle position detector according to claim 1,
wherein said vehicle position detector outputs:
together with said satellite positioning position, a satellite positioning direction obtained on the basis of said satellite positioning position, and
together with said autonomous navigation position, an own-vehicle direction obtained by said autonomous navigation.

9. A vehicle position detecting method, comprising:
(a) detecting an own-vehicle position by satellite positioning as a satellite positioning position;
(b) detecting said own-vehicle position by autonomous navigation as an autonomous navigation position;
(c) determining occurrence of a position jump on the basis of a positional difference between said satellite positioning position and said autonomous navigation position; and
(d) selecting one of said autonomous navigation position and said satellite positioning position on the basis of positioning precision of said satellite positioning and a result of said determining in (c),
wherein one of said autonomous navigation position and said satellite positioning position is output as said own-vehicle position on the basis of a result of said selecting in (d).

\* \* \* \* \*